United States Patent [19]

Spanur et al.

[11] 4,056,659

[45] Nov. 1, 1977

[54] PRIMARY DRY CELL HAVING A NOVEL VENTING CLOSURE

[75] Inventors: Frank George Spanur, Parma Heights; Vicente Santo Domingo Alberto, Parma, both of Ohio

[73] Assignee: Union Carbide Corporation, New York, N.Y.

[21] Appl. No.: 657,210

[22] Filed: Feb. 11, 1976

[51] Int. Cl.$^2$ .............................................. H01M 2/12
[52] U.S. Cl. .................................... 429/54; 429/171; 429/218
[58] Field of Search ............... 136/133, 178, 168, 179; 429/54

[56] References Cited

U.S. PATENT DOCUMENTS

| 819,159 | 5/1906 | Newbold | 136/168 |
|---|---|---|---|
| 3,090,824 | 5/1963 | Reilly et al. | 136/133 |
| 3,923,548 | 12/1975 | Bell et al. | 136/178 |

FOREIGN PATENT DOCUMENTS

| 275,977 | 7/1914 | Germany | 136/133 |

Primary Examiner—Donald L. Walton
Attorney, Agent, or Firm—Clement J. Vicari

[57] ABSTRACT

A primary dry cell comprising a metal anode cup having a cathode mix therein, an open end, a central cathode rod through the open end, and a closure, the closure having a central bore and a venting sleeve defined by an annular groove in the closure and being disposed proximate the central bore.

9 Claims, 6 Drawing Figures

U.S. Patent    Nov. 1, 1977    4,056,659
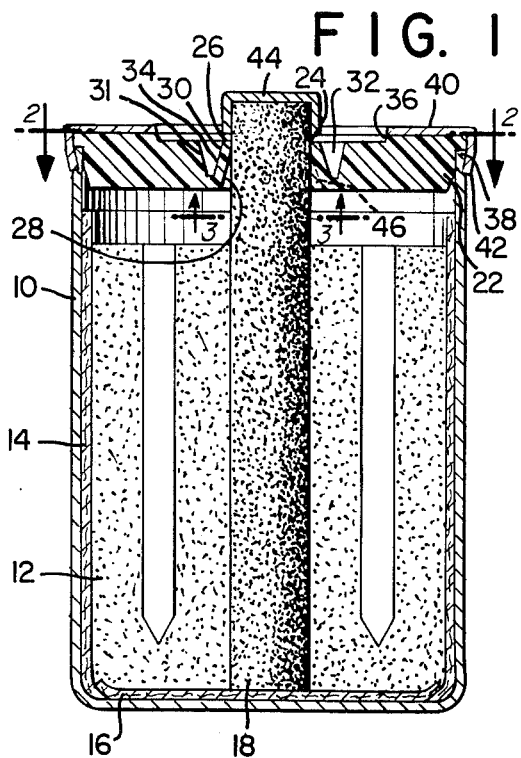
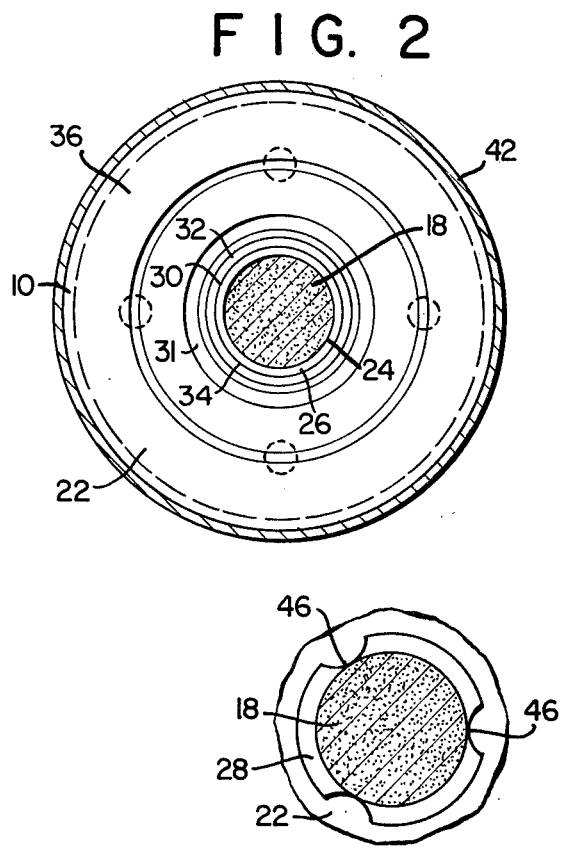
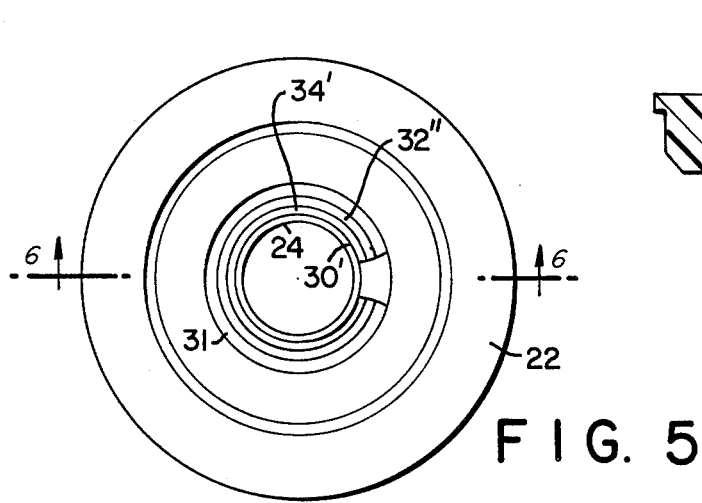
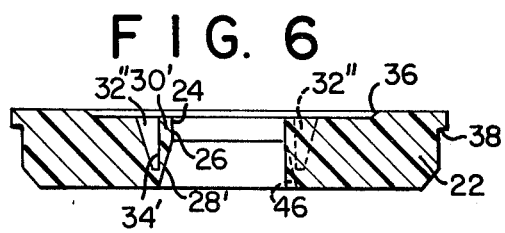

PRIMARY DRY CELL HAVING A NOVEL VENTING CLOSURE

This invention relates to dry cells and especially dry cells employing a magnesium anode, and more specifically concerns the provision of a novel venting closure means for releasing gas pressure developed during discharge of such cells.

Magnesium dry cells are ideally suited for use as the power source in many applications where a high working voltage is required. As compared to the conventional Leclanche dry cell with a zinc anode, magnesium cells operate at a voltage of about 0.3 volt higher under conditions of equivalent current drain. Despite this rather significant advantage, magnesium cells have not yet attained widespread use primarily because they have been plagued by many difficulties.

One of the most serious difficulties encountered with magnesium cells is that of gas generation and possible build-up of dangerous gas pressure during discharge of the cells. This is due to the rather poor efficiency of the active magnesium anode which reacts wastefully with water in the electrolyte to produce hydrogen gas in copious quantities.

In the past, Leclanche dry cells have employed venting means for releasing gas pressure developed within the cell. Usually this venting means has consisted of an open diffusion vent of one type or another formed within the cell closure. While this type of venting means may be satisfactory for a Leclanche dry cell, it is by no means suitable for use in a magnesium cell since an open diffusion vent is not capable of rapidly releasing large quantities of gas from inside the cell. A magnesium cell generally will produce gas on normal discharge at a rate of up to one thousand times faster than a Leclanche dry cell which does not generate gas in serious quantities until the cell has been completely discharged.

Another disadvantage of an open diffusion type vent as used in prior Leclanche dry cells is that it too readily permits the continued loss of moisture from the cell. For extended shelf life, a magnesium cell must be capable of retaining substantially all of its initial water content and consequently the cell is required to be hermetically sealed during the period of shelf storage.

Still another disadvantage of such prior diffusion type vents is that they are open at all times during discharge as well as when the cell is on shelf. Ideally, venting means for a magnesium cell should be capable of maintaining the cell in a sealed condition during shelf storage and then rapidly releasing copious quantities of gas generated when the cell is discharged. In addition, the venting means should be capable of resealing itself once the gas pressure has been released. Moreover, the venting means used must be simple in construction and inexpensive to manufacture Another problem that is frequently encountered in magnesium cells is that some of the gas that is generated under abusive conditions becomes entrapped inside the cell and cannot be vented. The vent through which the gas escapes to the ambient environment is normally located in the seal closure at the top of the cell. Gas that is generated near the bottom of the cell owing to the anodic activity of the anode cup bottom, must pass completely through the cathode mix and into the void space located beneath the closure where the gas accumulates prior to its escape through the vent. However, some of this gas becomes trapped and the resultant gas pressure that develops pushes on the cathode mix and actually causes it to rise inside the cell like a piston, and eventually the cathode mix comes into contact with the underneath side of the closure and blocks the vent. As the gas pressure continues to rise, the cell will eventually split or the seal closure will be pushed out from the cell.

Attempts have been made to solve this problem in various ways, such as by placing mechanical restraint on the cathode mix to prevent its movement, but these attempts have not consistently given positive results. In more recent attempts, gas venting passageways have been provided in or around the cathode mix. Thus for example according to the disclosure of copending application Ser. No. 537,595 filed on Dec. 30, 1974 now U.S. Pat. No. 3,932,196 and assigned to a common assignee, there is provided a primary dry cell comprising a metal anode cup having an open end which is gas-tightly sealed by a closure including a vent and having a cathode mix therein comprising particles of an oxidic depolarizer, finely-divided conductive material and an electrolyte. The closure and cathode mix define a void space therebetween. A gas-venting passageway extends through the cathode mix into communication with the void space to enable gas normally entrapped near the bottom of the anode cup to pass freely through the cathode mix and into the void space from whence the gas can escape through the vent.

Although the provision of gas venting passageways in the cathode mix ameliorated most of the problems incident to gas pressure build-up in the bottom of the cell, it was nevertheless found that conventional vents situated in the closure cell, did not satisfactorily allow for the increased venting rates required.

Accordingly it is a principal object of the present invention to provide a closure having a novel venting seal for use in a primary dry cell.

A further object is to provide a closure having a novel venting seal for a magnesium dry cell which cooperates with gas venting passageways in the cathode mix for enabling gas normally entrapped near the bottom of the cell to pass freely through the cathode mix and thence out the venting seal.

These and other objects will be apparent from the following description of the invention when taken in conjunction with the accompanying drawing in which:

FIG. 1 is an elevational view, in section of a preferred embodiment of a magnesium dry cell construction in accordance with the invention;

FIG. 2 is a plan view taken along the lines 2—2 of FIG. 1;

FIG. 3 is a view taken along the lines 3—3 of FIG. 1 showing the equally spaced protrusions on the tapered surface of the bore of the seal which are also employed in all the modifications of the closure;

FIG. 4 is a modified closure that can be used in the cell shown in FIG. 1;

FIG. 5 is a plan view of another modified closure that can be used in the cell shown in FIG. 1; and FIG. 6 is a section taken along lines 6—6 of FIG. 5.

Broadly contemplated the present invention provides a primary dry cell comprising a metal anode cup having an open end and having a cathode mix thereon, a central cathode rod protruding through the open end of the anode cup, and a closure for the open end. The closure includes a central bore adapted to be in interference fitting relationship when positioned on the central cathode rod, and a venting sleeve defined by an annular groove in the closure and being disposed proximate the central bore. The venting sleeve is adapted to be urged outwardly away from the central cathode rod upon the development of a safe predetermined gas venting pressure within the cell thereby permitting venting of gas from the interior of the cell.

Referring now to the drawing and particularly to FIG. 1, there is shown a preferred embodiment of a primary dry cell comprising a cylindrical anode cup 10 made of magnesium metal or a magnesium alloy, and having an upper open end and a closed bottom end. Within the anode cup 10 there is a cathode mix 12 comprising particles of an oxidic depolarizer, such as manganese dioxide, finely-divided conductive material, such as acetylene black, and an electrolyte. Suitably, the electrolyte may be an aqueous magnesium perchlorate solution, for example. The cathode mix 12 is separated from the side wall of the anode cup 10 by a porous, ionically permeable separator 14, suitably a porous kraft paper. The cathode mix 12 is also separated from the anode cup bottom by a porous paper or cardboard washer 16. The washer 16 is also permeable to the electrolyte and renders the anode cup bottom anodically active along with the side wall of the anode cup 10. A porous central carbon electrode element 18 (central cathode rod) is embedded in the cathode mix 12 and protrudes slightly beyond the upper open end of the anode cup 10. The closure for the cell comprises an annular seal member 22, which is gas tightly sealed within the open end of the anode cup 10. Seal member 22 can be molded from a variety of different type materials which afford the requisite strength and resiliency required. A plastic material is the preferred choice of construction material and particularly high melting temperature resins such as nylon and Minlon 10A (a registered trademark of E. I. DuPont de Nemours & Co., Inc. for a mineral filled nylon). Low melting temperature resins such as polyethylene, polypropylene and talc-filled polypropylene, although operable, do not however perform satisfactorily for all requirements and accordingly are less preferred. The most preferred choice of construction material is Minlon 10A because of its relatively low cost and ease of molding.

As best seen in FIGS. 1 and 2, the seal member 22 is provided with a central bore 24 which is made up of two sections. One section represented by reference number 26, has a uniform smooth surface which is slightly smaller in diameter than the mating carbon electrode element 18 on which it is press-fitted. In general, section 26 constitutes about one-third of the total vertical length of the seal member 22. A second section represented by reference numeral 28 extends downwardly from the first section 26 and tapers outwardly assuming a funnel-like configuration. The surface of the second section 28 serves as a lead in for mounting the seal member 22 onto the porous carbon element 18 and also exposes more internal surface to the actuating pressure developed within the cell.

Situated proximate the electrode element 18 is a venting sleeve 30 which is defined by an annular groove, preferably a V-shaped groove 32 and which extends continuously perimetrically around the electrode element 18.

The venting sleeve 30 has one side defined by the inner periphery 34 of groove 32 and the other side defined by the periphery of central bore 24. As will be noted from FIG. 1, the surface of the second section 28 of central bore 24 is substantially parallel to the inner periphery 34 of groove 32. This construction provides a uniform sleeve thickness from the base of sleeve 30 to the sealing surface represented by the first section 26 of central bore 24. The outer periphery of groove 32 is represented by reference numeral 31.

In general, the fit of the sealing and venting surface, i.e., section 26 to the mating carbon electrode element 18 is preferably an interference fit and the appropriate dimensions can be determined primarily by the strength of the materials utilized. The interference must be greater with more elastic materials to achieve equal initial pressure release.

The thickness of the venting sleeve can also be varied to achieve the desired initial release pressure. Merely as illustrative, to fulfill the requirements of part moldability and functioning characteristics, a sleeve thickness of about 0.016 to about 0.25 inch can be utilized with the dimensions varying between these limits along the first and second sections of the venting sleeve 30. For example, in the venting sleeve shown in FIGS. 1 and 2, the angle of the surface of the second section 28 and the angle of the inner periphery 34 of groove 32 are identical resulting in a uniform measurement (0.025 inch thickness) from the base of the second section to the sealing surface of the first section 26. From this point, the sleeve tapers to a decreased wall thickness (0.016 inch).

As mentioned previously, the central bore 24 is fitted tightly around the carbon electrode element 18. The seal member 22 is provided with an annular raised peripheral edge portion 36 on its top surface which forms a shoulder 38 resting on the upper peripheral edges of the anode cup 10. A seal ring, preferably a steel ring 40 having a leg portion 42 is compressed and the leg portion 42 is forced inwardly under a high radial pressure against the exterior side wall of the anode cup 10 urging it inwardly to form a tight radial seal between the abutting outer edges of the seal member 22 and the interior side wall of the anode cup 10 with the shoulder 38 resting on the upper peripheral edges of the anode cup 10. A metal terminal cap 44 is fitted over the top of the carbon electrode element 18 and serves as the positive terminal of the cell.

Although not required for the venting function, the seal member is provided with protrusions 46 as shown in FIG. 3. Thus referring to FIG. 3, the protrusions 46 extend from the seal member 22 and act as gripping fingers which hold the carbon electrode element 18 more firmly and provide more even sealing than would be possible with only the venting sleeve 30. When the steel seal ring 40 is radially crimped, the gripping of these protrusions or fingers 46 are enhanced by the resultant reduction in diameter of the seal member 22. Although three such equally spaced protrusions are shown in FIG. 3, it will be understood that more than three protrusions can be utilized and the appropriate number would depend upon the degree of gripping required, the type of internal pressure developed in the cell and the type of material selected for the seal member 22.

During the time that the cell is on shelf storage when little if any gas is generated, the venting sleeve 30 is normally in closed position, i.e., the first section 26 tightly surrounds the carbon electrode element 18 and the second section 28 is flared away from the carbon electrode element 18. In this position, there is substantially little, if any, loss of moisture from the cell. However, when the cell is being discharged, there may be generated copious quantities of gas which must be vented to prevent the buildup of an excessive or unsafe internal gas pressure inside the cell. When the safe predetermined gas venting pressure is reached, the lower or second section 28 is urged away from the carbon electrode element 18 causing the seal formed by the first section 26 to be momentarily broken allowing gas to escape from the cell. Once the gas pressure has been released, the first section 26 returns to its initial position around the central carbon electrode 18 thus resealing the cell.

FIG. 4 shows a modification of the venting sleeve 30 wherein the thinnest wall section is at the base of the sleeve 30' or section 28'. In other words, utilizing the dimensions discussed with respect to the preferred embodiment, the largest thickness of the venting sleeve 30' (0.025 inch) is in the first section and the sleeve tapers to a decreased wall thickness (0.016 inches) in the second section. This can be effected by changing the angle formed by the inner periphery 34' of groove 32' so that the inner periphery 34' is non-parallel to the second section 28'.

Another modification of the sealing member 22 is illustrated in FIGS. 5 and 6. In FIGS. 5 and 6 the annular groove 32" instead of being perimetrically continuous, is molded with at least one rib section to increase the strength of the venting sleeve 30' and prevent closure distortion during the steel ring crimping operation. Although the modified annular groove construction is shown with respect to the modification of FIG. 4, it is equally applicable to the construction indicated in the preferred embodiment.

Although not essential for efficient operation, it has nevertheless been found that improved seal reliability can be achieved if a sealant material such as silicone or petroleum grease, wax, asphalt and the like, is applied to the carbon electrode element 18 prior to force fitting the seal member 22 onto the carbon electrode element. Utilization of the sealant material improves the seal reliability by compensating for the electrode surface porosity and physical imperfections.

In one series of tests, eight magnesium cells having the novel venting closure of the instant invention were fabricated. The construction material of the closure was a mineral filled nylon (Minlon 10A). A venting sleeve thickness of 0.016 to 0.025 inches was used. Asphalt sealant was employed. The cells were provided with gas venting passageways in the cathode mix as taught in application Ser. No. 537,595. Six of the cells were subjected to 0.280 ohms continuously and two cells were subjected to short circuit. There were no failures. Moisture loss measurement showed that novel venting seal allowed approximately 3 mg. ($H_2O$) per day, loss at 160° F. This is significantly lower than the art recognized allowable loss of 12 mg. per day at 160° F. The cells were of a standard diameter ("C" size) but longer than usual with an overall height of 3.25 inches. approximately.

What is claimed is:

1. A magnesium dry cell comprising a metal anode cup having an open end and having a cathode mix therein, a central cathode rod protruding through said open end of said anode cup, and a closure for said open end, said closure including a central bore having at least three protrusions in contact with said cathode rod and adapted to be in interference fitting relationship when positioned on said central cathode rod, said central bore including a first section having a uniform and smooth surface which is slightly smaller in diameter than the diameter of said cathode rod and a second section extending downwardly from said first section and tapering outwardly away from said cathode rod and a venting sleeve defined by an annular groove in said closure and being disposed proximate said central bore, said venting sleeve being adapted to be urged outwardly away from said central cathode rod upon the development of a predetermined gas pressure within said cell thereby permitting venting of gas from the interior of said cell.

2. A magnesium dry cell according to claim 1 wherein said magnesium dry cell includes a gas-venting passageway extending through said cathode mix.

3. A magnesium dry cell according to claim 1 wherein said groove includes an inner and outer periphery and wherein said venting sleeve is formed by the inner periphery of said groove and the periphery of said central bore.

4. A magnesium dry cell according to claim 3 wherein the surface of said second section is substantially parallel to said inner periphery of said groove.

5. A magnesium dry cell according to claim 4 wherein the thickness of said first section is less than the thickness of said second section.

6. A magnesium dry cell according to claim 3 wherein the surface of said second section is non-parallel to said inner periphery of said groove.

7. A magnesium dry cell according to claim 6 wherein the thickness of said first section is greater than the thickness of said second section.

8. A magnesium dry cell according to claim 1 wherein said annular groove extends continuously perimetrically around said central cathode rod.

9. A magnesium dry cell according to claim 1 wherein said annular groove extends non-continuously perimetrically around said central cathode rod.

* * * * *